United States Patent [19]

Besik

[11] 4,188,289
[45] Feb. 12, 1980

[54] PROCESS FOR PURIFICATION OF SANITARY WATERS

[76] Inventor: Ferdinand Besik, 3243 Chokecherry Crs., Mississauga, Ontario, Canada, L5L 1B1

[21] Appl. No.: 918,051

[22] Filed: Jul. 18, 1978

[51] Int. Cl.² .......................... C02C 1/08; C02C 1/40
[52] U.S. Cl. ........................................ 210/7; 210/14; 210/17; 210/63 R; 210/64; 210/DIG. 28; 210/DIG. 29
[58] Field of Search .................. 210/3, 4, 7, 8, 14, 210/15, 17, 18, 20, 27, 40, 63 R, 63 Z, 150, 151, 189, 195 R, 195 S, 199, 202, 206, DIG. 28, DIG. 29

[56] References Cited

U.S. PATENT DOCUMENTS

| Re. 27,721 | 8/1973 | Klock | 210/17 |
|---|---|---|---|
| 3,700,590 | 10/1972 | Burton | 210/17 |
| 3,803,029 | 4/1974 | Blecharczyk | 210/40 |
| 3,878,097 | 4/1975 | Mochizuki | 210/151 |
| 3,907,673 | 9/1975 | Belk et al. | 210/17 |
| 3,980,556 | 9/1976 | Besik | 210/DIG. 28 |
| 4,008,159 | 2/1977 | Besik | 210/14 |
| 4,009,099 | 2/1977 | Jeris | 210/17 |
| 4,076,615 | 2/1978 | Olesen et al. | 210/18 |
| 4,104,167 | 8/1978 | Besik | 210/202 |

FOREIGN PATENT DOCUMENTS 2420744 10/1975 Fed. Rep. of Germany ........... 210/151

Primary Examiner—Charles N. Hart
Assistant Examiner—Ernest G. Therkorn

[57] ABSTRACT

A purification process for removal of suspended solids, carbonaceous material, nitrogenous material, phosphorus, refractory organics, bacteria and viruses comprises of combining and carrying out the various biochemical and chemical reactions and separation of the suspended solids in a single sludge system in a simplified process sequence suitable for use in a single reaction tank.

The biooxidation, nitrification, denitrification and chemical precipitation processes are carried out in presence of mixed microbial population entrapped into fluidized nonbiodegradable suspended solids with portion of the fluidized suspended solids circulating through three reaction zones having varying concentration of disolved oxygen to maintain environmental conditions to support growth of the microbial population and simultaneously to maintain operating conditions required to carry out the involved reactions.

The fluidized suspended solids entrap the active microorganisms, colloidal matter and suspended solids present in the incoming waste water and/or generated during purification of the waste water, improve the settling properties of the resulting sludge and enhance separation of suspended solids from the purified waste water.

The concentration of the active microbial population in this purification process is significantly higher than that achieved by the prior art processes resulting in better performance, more efficient removal of pollutants and reduced treatment costs. The followed chemical oxidation provides for removal of remaining impurities and killing of bacteria and viruses.

4 Claims, 3 Drawing Figures

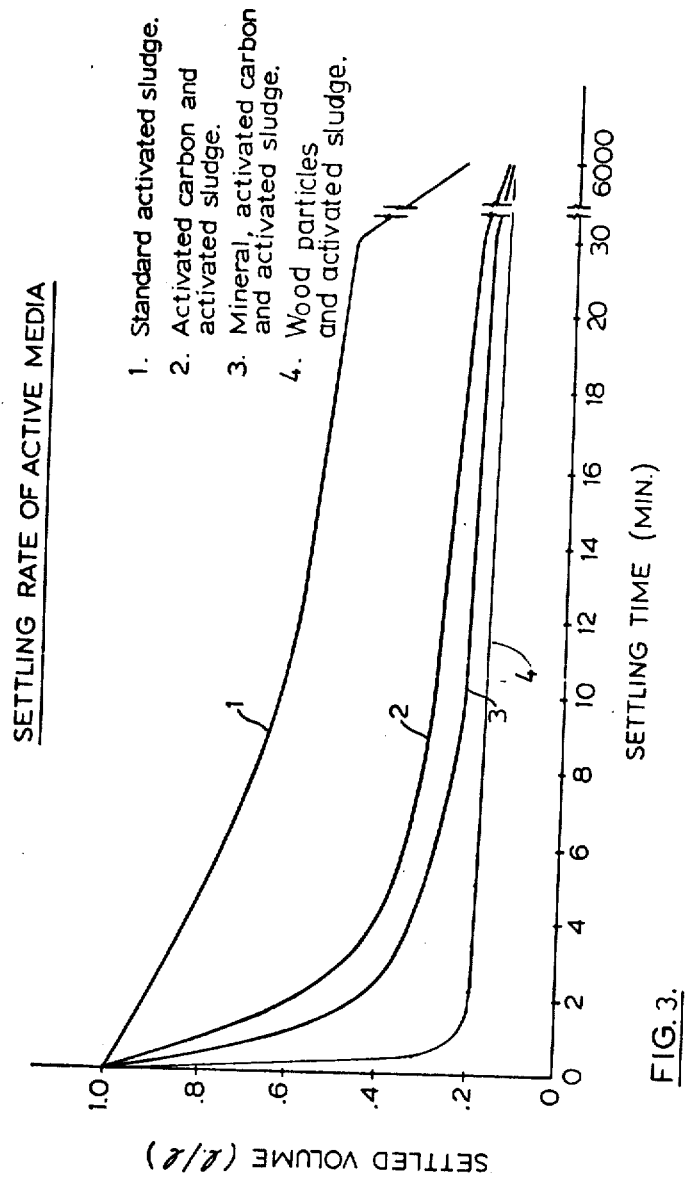

PROCESS FOR PURIFICATION OF SANITARY WATERS

FIELD OF INVENTION

This invention relates to purification of waste waters, particularly to removal of pollutants such as suspended solids, carbonaceous material, nitrogenous material, phosphorus, bacteria and viruses present in domestic waste waters.

The process of this invention utilises fluidized nonbiodegradable suspended solids to increase the concentration of mixed microbial population in the reaction system to improve the efficiency of biochemical reactions, to improve the efficiency of chemical precipitation of phosphorus through more efficient coagulation of the formed precipitates and through adsorption of phosphorus on the fluidized suspended solids and to improve the efficiency of separation of suspended solids from the purified wastewater by coagulation of the solids into large flocs retained in the fluidized bed.

The process hydraulics permitts better control of the enviromental conditions required by the microbial population and the simultaneously occuring biooxidation reactions requiring oxygen and denitrification reactions requiring absence of oxygen.

BACKGROUND TO THE INVENTION

It has become evident that nitrogen and phosphorus affect the productivity of aquatic life - nitrogen being the limiting nutrient in eutrophic waters and phosphorus in oligotrophic waters.

It is also known that municipal waste waters contain from 10 to 100 times the nutrient concentration of agricultural or forest drainage. Consequently in densely populated areas overfertilization of surface waters, algae growth and chemical pollution have been noticed along with degradation of potable water sources and the need for more efficient removal of organics, nitrogenous compounds and phosphorus from all waste waters has become more obvious.

While removal of phosphorus can be achieved reliably by chemical precipitation and removal of organics by biological followed by physical chemical processes, removal of nitrogen is more complicated.

The current processes of ammonia stripping, break point chlorination, ion exchange and biological nitrification followed by biological denitrification are relatively complex and expensive.

Although conventional activated sludge process is capable of removing up to 50-60 percent of the nitrogen from treated waste waters, the removal of nitrogen is eratic and in most cases its major part is discharged in mineralized form in the effluent.

The biological transformations of nitrogenous compounds occur through biological processes of ammonification, nitrification and denitrification. The first two require presence of oxygen, the denitrification require absence of oxygen. The two distinct mechanisms responsible for removal of nitrogen and reduction of nitrite and nitrate are (a)—formation of ammonia followed by transfer of ammonia into the anabolic cell metabolism which is of minor importance since C:N ratio in cell tissue is 5-6, whereas in domestic waste waters only 2-2.5, and (b)—microbial denitrification, which is a respiratory reduction in which nitrite and nitrate replace oxygen as the final electron acceptors in the respiration chain.

Considerable number of heterotrophic facultative and obligate anaerobic bacteria species can transfer electrons to nitrite instead of oxygen in the respiratory chain, and all substrates normally used by the cells for respiration may serve as electron donors for the reduction process regardless of whether they are present in the external medium, or whether they have to be mobilized from intracellular assimilates.

The reduction of nitrate is considered to be an adaptive property of those bacteria that can reduce nitrite for respiration.

The reduction mechanism for biooxidation of organic matter and for transformation of the nitrogenous compounds is expressed by reactions listed in Table 1.

Biooxidation of organic matter, ammonification and nitrification cause no problems. Nitrification is efficient and reliable if organic loadings are maintained below 0.3 lb BOD per lb of mixed liquor suspended solids per day, sludge age is maintained above 3-4 days and disolved oxygen in the mixed liquor is maintained above 1.0-2.0 mg/lit. The higher is the concentration of mixed liquor suspended solids, the more efficient is the transformation of ammonia to nitrite and nitrate. The overall rate of denitrification is a function of the concentration of the heterotrophic facultative bacteria present in mixed liquor suspended solids and their activity in the absence of oxygen. To maintain the activity the denitrifying bacteria must be supplied with suitable organic material-source of energy.

From the process point of view to accomodate the different food and oxygen requirements of biooxidation of organic matter, ammonification and nitrification of nitrogenous compounds and decomposition of nitrite and nitrate by the microbial respiration and to achieve acceptable reaction rates and efficiencies, the various biochemical reactions are currently being carried out in separate process stages. While the conventional activated sludge process is capable of removing nitrogen with efficiency of 50-60 percent, the current multistage processes can achieve the removal of nitrogen with efficiency up to 80-90 percent.

The multistage processes currently in use in large municipal treatment plants require treatment facilities that are too complex to be scaled down to small package plants to serve small developments or single family dwellings. More, the established biological processes are inefficient in removal of biologically resistant compounds recognized as refractory organics and the Physical-chemical treatments are inefficient in removal of low organic acids and low carbohydrates both highly soluble and present in considerable concentrations in domestic and municipal waste waters. Consequently neither the biological, nor the chemical - physical treatments alone can efficiently reduce the concentration of organic contaminants to the level found in fresh waters. The required combination of the biological and physical - chemical treatments therefore further increases the complexity of the treatment and the treatment facilities.

Furthermore, biological processes that utilize low organic loadings to achieve low yields generate sludges that have poor coagulation properties, requiring low overflow rates in clarifiers and causing relatively high losses of solids in effluents.

Because of the number of process steps required for removal of the various pollutants renovation and reuse of domestic waste waters at present seems feasible only if practiced on a large scale.

A large waste water treatment—renovation plant however requires large underground sewage collection—transportation network, and in case the renovated water is reused a large underground water distribution network. Such networks are expensive to build and even more expensive to maintain and to operate.

It is therefore obvious that on-site renovation and reuse of waste water would be economically more attractive than renovation and reuse of waste waters via central collection-treatment-distribution. However, because of the complexity of the involved treatment on-site renovation and reuse of domestic waste water as yet can't be practiced.

Although, at present small package sewage treatment plants are available, they do not provide the required degree of purification that would permit reuse of the purified effluent and in general they also lack the required process stability.

It is therefore the prime object of this invention to reduce the number of process steps required by the present art and carried out in separate process stages when removing suspended solids, carbonaceous material, nitrogenous material, phosphorus, bacteria and viruses from domestic waste waters and to provide a purification process having a simple process sequence and capable of removing the various pollutants more-less simultaneously.

More particularly it is the object of this invention to provide a process for purification of sanitary waters and purification of some industrial waste waters, which would be capable of achieving reliable and efficient removal of suspended solids, biooxidation of organic matter, biological nitrificat on, biological denitrification, chemical precipitation of phosphorus, chemical oxidation of refractory organics and toxic compounds, efficient kill of bacteria and viruses and removal of the unreacted oxidizing agents to render the purified waste water suitable for reuse.

Another object of this invention is to provide a process for purification of waste waters, that will not be affected by shock hydraulic and organic loadings.

Another object of this invention is to provide a prosess for purification of waste waters, that will produce minimum excess sludge, will require minimum energy and will be capable of unattended operation.

Other objects and features of the invention will be set forth fully here in after.

The full nature of the invention will be understood from the accompanying drawings and following description and claims.

SUMMARY OF THE INVENTION

The present invention provides a prosess for purification of waste waters in which the various biological, chemical and physical processes required to remove pollutants can be carried out in a single sludge system in a single reactor divided by vertical partitions into independent reaction zones.

Processes carried out in first three reaction zones include:

(a) adsorption of disolved organic matter by fluidized suspended solids, (b) biooxidation of biodegradable organic matter i.e. heterotrophic oxidation, autotrophic oxidation and endogenous respiration, (c) ammonification followed by biological nitrification simultaneously with respiratory denitrification, (d) chemical precipitation of phosphorus by added mineral along with adsorption of phosphorus by fluidized bed suspended solids, (e) continuous separation of the fluidized bed solids from the purified waste water and recirculation of the fluidized bed solids between the three reaction zones.

The processes carried out in the fourth reaction zone include:

(a) chemical oxidation of the residual organics and toxic compounds by chemical oxidizing agents such as potassium permanganate and/or chlorine, (b) kill of bacteria and viruses by added oxidizing agents, (c) chemical precipitation of metal ions and/or salts by added oxidizing agents, (d) separation of precipitates and/or residual suspended solids entrained from third reaction zone by settling.

The chemical decomposition of the unreacted oxidizing agents by reaction of the agents with charcoal is carried out in the fifth reaction zone.

It has been proved that if the processes of biooxidation, ammonification, nitrification and denitrification are carried out in the presence of fluidized suspended solids the process performance and the purity of the processed waste water is improved. The relatively fast settling fluidized bed solids have a tendency to coagulate into large flocs entrapping the microorganisms and colloidal and suspended matter present in the waste water. The resulting sludge has higher density than the conventional activated sludge process sludge and exhibits filtration effect that improves the efficiency of separation of mixed microbial population and suspended solids from purified waste water. The controlled exposure of the microorganisms to food and oxygen in the presence of fluidized suspended solids as described in this invention permits removal of organic and nitrogenous compounds in a single sludge system together with chemical precipitation in a simple process sequence easily adaptable for use in small size package plants. Combined with chemical oxidation of residual organics carried out as indicated in this invention the purification process of this invention produces an effluent suitable for limited reuse.

DESCRIPTION OF THE DRAWINGS

The afornmentioned and other objects, advantages and features of the invention will become apparent in the following detailed description of the prefered embodiment as shown in the drawings wherein:

FIG. 3 is a graph showing the settling rate of various active media—sludges suitable for use in the process of this invention.

DESCRIPTION OF THE INVENTION

The removal of suspended solids, biooxidation of organic matter, ammonification, biological nitrification and biological denitrification of nitrogenous compounds and chemical precipitation of phosphorus from the incoming waste water is achieved in three reaction zones each containing fluidized bed of nondegradable suspended solids and mixed microbial population, with the fluidized bed suspended solids being circulated from third reaction zone to first reaction zone then from first reaction zone to second reaction zone and from second to third reaction zone. The biochemical reactions occuring in these three reaction zones are listed in Table 1.

Excluding the synthesized nitrogen the removal of nitrogen is via steps of biological nitrification followed by denitrification with most of the nitrite nitrogenous material being converted to nitrogenous gas through respiration of the mixed microbial population.

The conditions that make the reactions of biooxidation and nitrification requiring oxygen and the respiratory denitrification requiring absence of oxygen in the process of this invention possible are:

(a) the active microbial population responsible for biooxidation of organic matter, nitrification and respiratory denitrification is entrapped into fluidized bed suspended solids, (b) the microbial population, fluidized bed suspended solids and portion of treated waste water is being circulated between reaction zones in the direction from third reaction zone to first, to second and to third reaction zone, (c) the microbial population on its way through the three reaction zones is exposed to an environmental cycle composed of:
  i. contact of the microorganisms with food in absence of disolved oxygen in the first reaction zone,
  ii. exposure of the microorganisms to oxygen in the second reaction zone, and
  iii. contact of the treated waste water containing nitrite and/or nitrate nitrogenous material with mixed microbial population in absence of oxygen and in presence of organic material adsorbed on the fluidized bed suspended solids in the third reaction zone, (d) a suitable soluble mineral not interfering with biochemical reactions and capable of precipitating phosphorus and other metal ions is being added into the fluidized bed established in second reaction zone, and (e) the separation of the microbial population and fluidized bed suspended solids from the purified waste water is achieved by a submerged suspended solids separator located in the third reaction zone.

Figure 1:
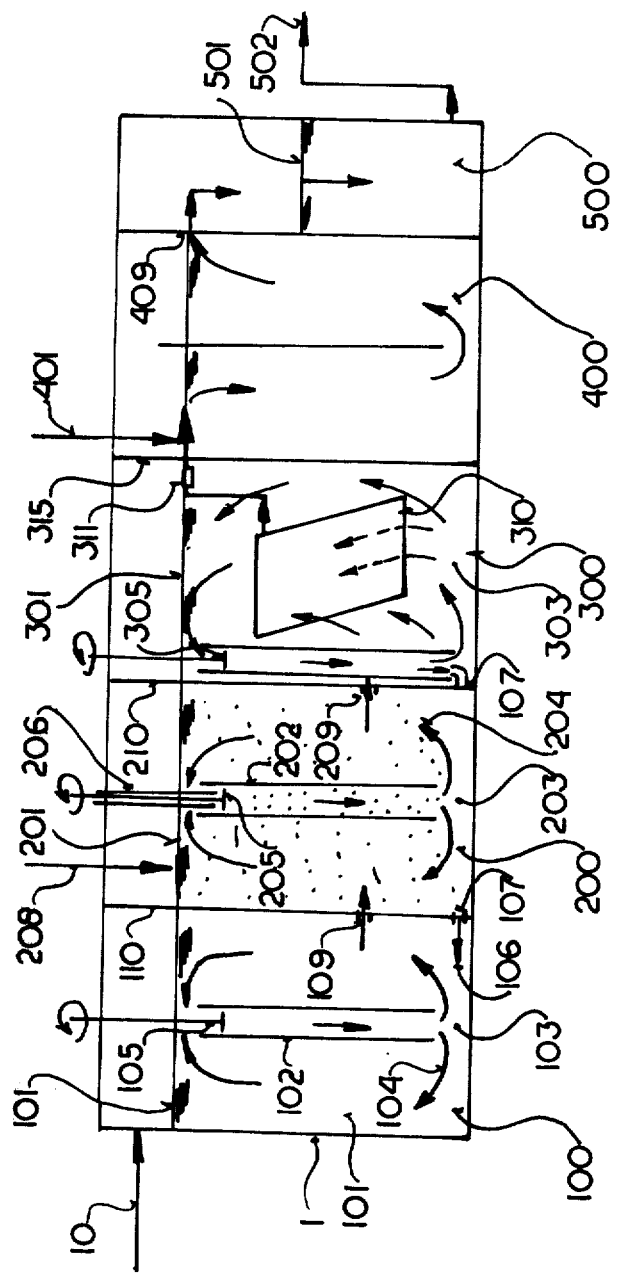
FIG. 1 is a schematic representation of the purification process of this invention showing a vertical cut away view through the reaction zones used in accordance with this invention.
Figure 2:
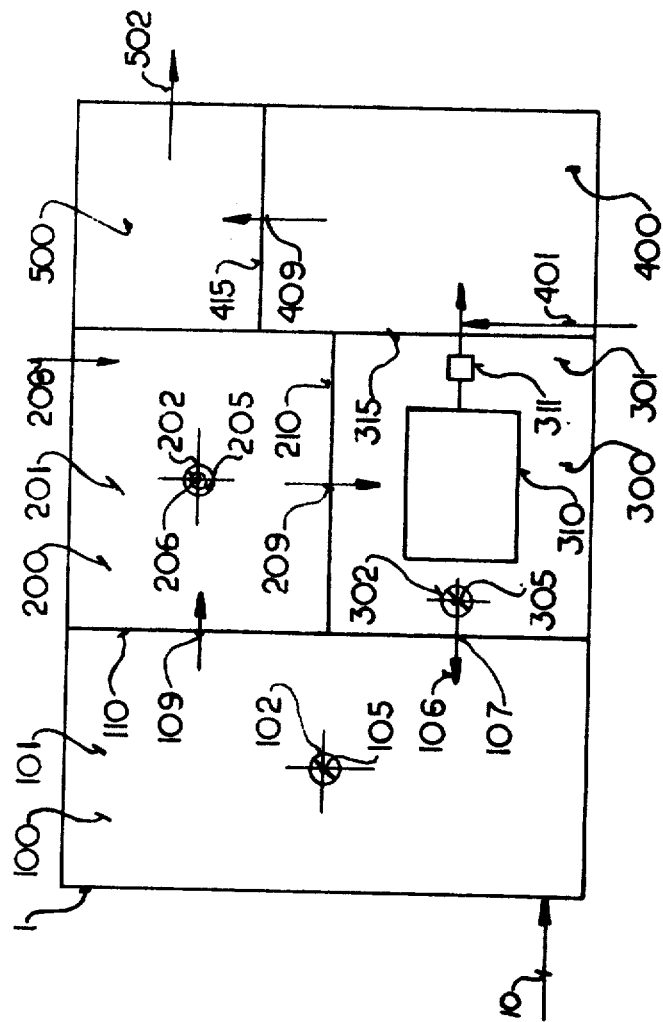
FIG. 2 is a schematic representation of the purification process of this invention showing a horizontal lay out of the reaction zones used in accordance with this invention.

The schematic diagram of the process of this invention is shown in FIG. 1 and FIG. 2. As seen from FIG. 1 and FIG. 2 the purification process of this invention is carried out in a single reaction tank 1 separated by partitions into first reaction zone 100, second reaction zone 200, third reaction zone 300, fourth reaction zone 400 and fifth reaction zone 500.

The first reaction zone is in communication with the second reaction zone 200 by restricted opening 109 in the common partition 110 separating the first reaction zone from the second reaction zone, the second reaction zone 200 being in communication with third reaction zone 300 by restricted opening 209 in the common partition 210 separating the second reaction zone from the third reaction zone, the third reaction zone 300 being in communication with first reaction zone 100 by restricted opening 107 in common partition 110 separating the third reaction zone 300 from the first reaction zone 100 and third reaction zone 300 being in communication with fourth reaction zone 400 trough submerged multichannel suspended solids separator 310 located in the third reaction zone 300, the third reaction zone 300 being separated from the fourth reaction zone 400 by a common partition 315 between the third and fourth reaction zones, and the fourth reaction zone 400 being in communication with the fifth reaction zone 500 by a restricted opening 409 in the common partition 415 separating the fourth reaction zone 400 from the fifth reaction zone 500.

Fluidized bed 101, 201 and 301 is established in reaction zones 100, 200, and 300 by adding into the reaction zones initially fine wood particles such as saw dust and by accumulating the nonbiodegradable suspended solids present in the waste water and by accumulating the formed precipitates and by accumulating the excess biological solids formed during biological oxidation of the organic matter in reaction zones 100, 200, and 300.

The fluidized bed 101 in first reaction zone 100 is maintained by recirculating of a portion of the suspension from the upper level of the fluidized bed 101 downwardly in recirculation pipe 102 to the bottom 103 of the reaction zone 100 then upwardly through the fluidized bed 101 in direction of arrows 104. The recirculation of the suspension in first reaction zone 100 is maintained by a submerged propeller 105 located in recirculation pipe 102 in a way in which there is no addition of air or oxygen into the recirculated suspension and therefore the concentration of disolved oxygen in the liquid in fluidized bed 101 is maintained at close to zero mg/l. Simultaneously a portion of suspension 106 from third reaction zone 300 is being circulated into first reaction zone 100 via opening 107, the flow being maintained in the range from 50 to 200 percent of incoming waste water. The recycled suspension 106 contains mixed microbial population, precipitates, wood particles, nonbiodegradable suspended solids and purified waste water containing remaining nitrite and/or nitrate nitrogenous material. The chemically bound oxygen in the nitrite and/or nitrate nitrogenous material recycled with the suspension 106 from reaction zone 300 into fluidized bed 101 is used up in the respiration chain by the mixed microbial population kept in fluidized bed 101.

The incoming waste water 10 enters into first reaction zone 100 where it is mixed with mixed microbial population, wood particles, nonbiodegradable suspended solids, precipitates and purified waste water in fluidized bed 101. The activity of microorganisms in fluidized bed 101 is being increased by the disolved organic matter present in the incoming sewage causing complete degradation of nitrite and/or nitrate nitrogenous material present in the fluidized bed 101. In fluidized bed 101 portion of the disolved organic matter present in the incoming waste water is absorbed into the microbial cells, portion is biooxidized to carbon dioxide and portion is adsorbed by the fluidized particles. Simultaneously the disolved organic nitrogenous material is transformed by mixed microbial population kept in fluidized bed 101 to ammonia with small portion of the ammonia metabolized and small portion transformed through nitrite to nitrogenous gas. Simultaneously, portion of soluble phosphates present in the incoming waste water is metabolized and a small portion adsorbed by the fluidized bed particles.

From the first reaction zone 100 the suspension containing mixed microbial population, fluidized bed particles and partially purified waste water flows by gravity via opening 109 into second reaction zone 200 where it is mixed in fluidized bed 201 with mixed microbial population, fluidized bed particles, partially purified waste water, added disolved mineral and added diffused air. The fluidized bed in the second aeration zone 200 is maintained by recirculating a portion of suspension from the upper level of the fluidized bed 201 downwardly in recirculation pipe 202 to the bottom 203 of the reaction zone 200, then upwardly through the fluidized bed 201 in direction of arrows 204. The recirculation of the suspension is maintained by submerged propeller 205 located in recirculation pipe 202. The propeller 205 is equipped by an air intake pipe 206 and simultaneously injects into the recirculated suspension atmospheric air which is then mixed in recirculation pipe 202 with the recirculated suspension, then flown in pipe 202 downwardly to the bottom 203 of the reaction zone 200 then upwardly through fluidized bed 201 and finaly out to atmosphere. On its way through recirculation pipe 202 and fluidized bed 201 the oxygen from the air is being absorbed into the recirculated liquid, into the microbial cells, and adsorbed by the fluidized bed solids, then used up by the mixed microbial population in biooxidation of the organic matter present in the partially purified waste water and organic matter adsorbed on the fluidized bed solids, in biooxidation of the ammonia to nitrite and/or nitrate and also in chemical oxidation of organic and inorganic solids present in partially purified waste water. The concentration of the disolved oxygen in fluidized bed 202 is maintained in the range between 1.0 to 2.0 mg/lit by controlling of the volume of air injected by propeller 205 through pipe 206. Simultaneously a soluble mineral 208 is added into the fluidized bed 201 to precipitate soluble phosphates present in the partially purified waste water. In fluidized bed 201 the disolved biodegradable organic matter is biooxidized and the remaining ammonia transformed to nitrite and/or nitrate.

Because of the low concentration of disolved oxygen in fluidized bed 201, portion of the mineralized nitrogen is also transformed to nitrogen gas. Simultaneously, the disolved mineral 208 added into the fluidized bed 201 is precipitating the soluble phosphates and other metal ions present in the partially purified waste water.

From reaction zone 200 the suspension containing mixed microbial population, fluidized bed suspended solids, organic matter adsorbed on fluidized bed solids and the purified waste water containing mineralized nitrogen is flown by gravity via opening 209 into third reaction zone 300 where it is mixed with mixed microbial population, fluidized bed suspended solids and purified sewage.

The fluidized bed 301 in the third reaction zone 300 is maintained by recirculating a portion of suspension from the upper level of the fluidized bed 301 downwardly in recirculation pipe 302 to the bottom 303 of the reaction zone 300 with portion of the recirculated suspension being diverted into opening 107 and recycled into first reaction zone 100 and with the rest being flown upwardly through the fluidized bed 301 in the direction of arrows 304. The recirculation of the suspension in third reaction zone 300 is maintained by a submerged propeller 305 located in recirculation pipe 302 in a way in which there is no addition of air or oxygen into the recirculated suspension, and the concentration of disolved oxygen in the liquid in fluidized bed 301 due to the activity of the mixed microbial population kept in fluidized bed 301 is maintained at close to zero mg/lit. The activity of the mixed microbial population in fluidized bed 301 is supported substantially by the organic matter adsorbed on the fluidized bed suspended solids flown with the waste water from first reaction zone 100 into second reaction zone 200 and from second reaction zone 200 into third reaction zone 300. In fluidized bed 301 the adsorbed organic matter is biooxidized and the nitrite and/or nitrate nitrogenous material is decomposed to nitrogenous gas by respiration by the mixed microbial population. The suspension containing the fluidized bed solids and the purified waste water enters into a submerged multichannel suspended solids separator 310 in which the suspended solids are separated from the purified waste water and continuously flown by gravity into the fluidized bed 301 and the purified waste water is flown through a flow equalizer 311 into reaction zone 400. The flow equalizer 311 controls the flow of the purified waste water through the submerged multichannel suspended solids separator 310 within the designed range regardless of the flow of the incoming waste water. At a surge flow of the incoming waste water the flow equalizer 311 causes to rise the normal operating level of the suspension kept in reaction zones 100, 200 and 300 to a higher level limited only by the space available in the three reaction zones, with the incoming waste water being substantially accumulated in reaction zone 100 and the partially purified waste water being substantially accumulated in reaction zones 200 and 300. During and after the surge at an equalized rate controled by flow equalizer 311 the purified waste water is being flown through the submerged multichannel suspended solids separator 310 into the fourth reaction zone 400 with the level of suspension in reaction zones 100, 200, 300 being returned to the pre-surge height. In this way the detrimental effect of the hydraulic and BOD surge loadings on the involved biological, chemical and physical processes in the purification process of this invention is eliminated.

As the purified waste water containing residual refractory organics, bacteria and viruses flows out of reaction zone 300 into reaction zone 400, oxidizing agents 401 potassium permanganate or chlorine or their mixture i.e. permanganate and hypochlorite is added to the purified waste water. Sufficient retention time is provided in reaction zone 400 to substantially completely oxidize the residual organics, to kill bacteria and viruses and to settle out the formed or entrained suspended solids.

From reaction zone 400 the purified waste water containing unreacted oxidizing agent flows by gravity via opening 409 into reaction zone 500 containing a bed of granular charcoal 501. In contact with charcoal 501 the unreacted oxidizing agents present in the purified waste water are decomposed to harmless products and the purified waste water is flown out of reaction zone 500 via line 502 for disposal or for reuse.

FIG. 3 illustrates the settling rate of different active media-sludges and the settling rate of the fluidized bed particles used in the purification process of this invention.

TABLE 1

BIOCHEMICAL REACTIONS.

BIOOXIDATION:

TABLE 1-continued

BIOCHEMICAL REACTIONS.

| | | |
|---|---|---|
| Heterotrophic oxidation: | $2(CH_2O)_x + N_y + P_z + O \rightarrow$ | $(CH_2O)_xN_yP_z + CO_2 + H_2O$ |
| Autotrophic oxidation: | $CO_2 + H_2O + N_y + P_z \rightarrow$ | $(CH_2O)_xN_yP_z + O_2$ |
| Endogeous respiration: | $(CH_2O)_xN_yP_z + O_2 \rightarrow$ | $CO_2 + H_2O + N_y + P_z$ |
| NITRIFICATION: | $2NH_4 + 3O_2 \rightarrow$ | $2NO_2 + 4H + 2H_2O$ |
| | $2NO_2 + O_2 \rightarrow$ | $2NO_3$ |
| DENITRIFICATION: | | |
| With methanol: | $6H + 6NO_3 + 5CH_3OH \rightarrow$ | $5CO_2 + 3N_2 + 3H_2O$ |
| Respiratory: | Nitrite or nitrate + cell→ | nitrogen gas |

SUMMARY

It will be seen therefore, that the process of the present invention is able to remove substantially completely carbonaceous, nitrogenous and suspended solids, phosphorus, bacteria and viruses from waste waters containing such contaminants while avoiding the production of substantial quantities of excess biological sludge, in a simple sequence and in a simple equipment requiring little space and essencially no maintenance. Capital end operating costs are therefore significantly lower than with any other known waste water renovation treatment. Modifications are possible within the scope of the present invention.

I claim:

1. A process for the purification of waste waters containing carbonaceous materials, nitrogenous materials, phosphorus and suspended solids in a single reaction tank which comprises:
    (a) separating the reaction tank by vertical partitions into first reaction zone, second reaction zone and third reaction zone, the first reaction zone being in communication with the second reaction zone by a restricted opening in the common partition separating the first reaction zone from the second reaction zone, the second reaction zone being in communication with third reaction zone by restricted opening in the common partition separating the second reaction zone from the third reaction zone, the third reaction zone being in communication with the first reaction zone by a channel and restricted opening in the common partition separating the third reaction zone from the first reaction zone, said third reaction zone being in communication with an exit effluent line via submerged multichannel suspended solids separator located in third reaction zone, said submerged multichannel suspended solids separator equipped with means equalizing the flow of the purified waste water through the submerged suspended solids separator, said purified waste water flowing out of said third reaction zone being further treated or disposed off,
    (b) establishing in first reaction zone, second reaction zone and third reaction zone fluidized beds, said fluidized bed in said first reaction zone, second reaction zone and third reaction zone being formed by addition of fine wood particles prefereably saw dust into the reaction zones before or during start up of the purification process and by accumulating the nonbiodegradable suspended solids present in the waste water, and by accumulating the precipitates formed in precipitating the phosphates from the processed waste water, and by accumulating the excess biological solids formed during biological oxidation of the organic matter present in the processed waste water, said fluidized bed in each reaction zone being maintained by flow path of the suspension downwardly from the upper level of the fluidized bed in a recirculation pipe to the lower level of the fluidized bed, then upwardly through the fluidized bed, said recirculation of the suspension in first reaction zone and third reaction zone being maintained by a submerged propeller located in the recirculation pipe without adding atmospheric air into the recirculated suspension and maintaining the concentration of the disolved oxygen in said first and third reaction zones at close to zero mg/lit, said recirculation of the suspension in the second reaction zone being maintained by a submerged propeller located in the recirculation pipe and equipped with an air intake pipe simultaneously injecting into the recirculated suspension atmospheric air to provide partial saturation of the recirculating suspension with oxygen and maintaining the concentration of the disolved oxygen in the second reaction zone between 1.0 and 3.0 mg/lit.,
    (c) adding into the fluidized bed established in the second reaction zone continuously soluble mineral to precipitate the various phosphates present in the incoming waste water, to coagulate and flocculate the colloidal matter present in the incoming waste water and to flocculate the fine suspended solids retained in said fluidized bed established in said first, second and third reaction zones,
    (d) circulating a portion of the fluidized bed suspended solids from the first reaction zone into the second reaction zone, from said second reaction zone into third reaction zone and from said third reaction zone into said first reaction zone,
    (e) flowing the incoming waste water into the fluidized bed established in said first reaction zone and mixing said waste water in said fluidized bed with the fluidized fine wood particles, nonbiodegradable suspended solids, mixed microbial population and recycled purified waste water,
    (f) controlling the retention time of said mixture of waste water and fluidized bed suspended solids in said first reaction zone to carry out during said retention time in said fluidized bed in said first reaction zone simultaneously the processes of:
        i. adsorbtion of the dissolved carbonaceous material on surfaces of the fluidized bed suspended solids
        ii. absorption of a portion of the dissolved carbonaceous material ammonia and phosphorus into microbial cells,
        iii. adsorption of a portion of soluble phosphates on to surfaces of said fluidized bed solids,
        iv. biological respiratory denitrification of nitrite and nitrate nitrogenous material to nitrogen gas,
        v. biological oxidation of a portion of dissolved carbonaceous material and a portion of the nonnitrite and/or non-nitrate nitrogenous material using up the oxygen present in the incoming waste water and the chemically bound oxygen in said nitrite and/or nitrate nitrogenous material, and vi. hydrolysis of the fluidized bed suspended solids, (g) allowing the formed carbon dioxide and nitrogenous gases to rise through the fluidized bed in said first reaction zone cocurrently to said suspension flow and separating the gases from said suspension at the upper level of the fluidized bed and releasing said gases to atmosphere, (h) flowing the mixture of partially purified waste water and the fluidized bed solids by gravity from said first reaction zone into said second reaction zone, mixing said mixture in said fluidized bed established in said second reaction zone with fluidized bed solids and with the diffused air injected into the recirculated suspension by said submerged propeller and carrying out in the second reaction zone simultaneously the processes of:

i. biooxidation of the remaining disolved carbonaceous material present in the partially purified waste water, ii. transformation of remaining non-nitrite and/or non-nitrate nitrogenous material to nitrite and/or nitrate nitrogenous material, iii. partial respiratory degradation of the nitrite and/or nitrate nitrogenous material to nitrogenous gas, iv. chemical precipitation of phosphates and free metal ions from the partially purified waste water by the added dissolved mineral, v. adsorption of a portion of soluble phosphates on the surfaces of the fluidized bed solids, vi. partial biooxidation of the carbonaceous material adsorbed on the fluidized bed solids, vii. hydrolysis of a portion of fluidized bed solids, viii. coagulation and flocculation of the colloidal matter present in the partially purified waste water, (i) allowing the excess diffused air and the formed carbon dioxide and nitrogenous gases to rise through the fluidized bed in said second reaction zone cocurrently to flow of said suspension and separating the gases from the suspension at the upper level of the fluidized bed and releasing the gases to atmosphere, (j) flowing the mixture of partially purified waste water and the fluidized bed solids by gravity from said second reaction zone into said third reaction zone, mixing said mixture in said fluidized bed established in said third reaction zone with the purified waste water and with the fluidized bed solids in absence of disolved oxygen and carrying out in said third reaction zone simultaneously the processes of:

i. biooxidation of the carbonaceous material adsorbed on the surfaces of the fluidized bed solids and biooxidation of the carbonaceous material absorbed by the microbial cells, ii. respiratory degradation of the nitrite and/or nitrate nitrogenous material to nitrogenous gas, iii. biooxidation of the disolved material released into the purified waste water through hydrolysis of said fluidized bed solids, iv. coagulation and flocculation of the colloidal matter present in the fluidized bed, v. separation of the suspended solids from the purified waste water, (k) allowing the formed carbon dioxide and nitrogenous gases to rise through the fluidized bed in said third reaction zone cocurrently to said suspension flow and separating the gases from the suspension at the upper level of the fluidized bed and releasing the gases to atmosphere, (l) flowing the suspended solids separated from the purified waste water in said reaction zone together with portion of the purified waste water back into said first reaction zone completing the process cycle and flowing the purified waste water out of said third reaction zone for further treatment or disposal.

2. The process of claim 1 wherein charcoal in powdered or granulated form is added into the fluidized bed in said first, second and third reaction zones, said charcoal improving the properties of the fluidized bed solids and enhancing the efficiency of the involved processes.

3. The process of claim 1 wherein a fourth reaction zone separated by vertical partitions from first, second and third reaction zones is formed in said reaction tank, said purified waste water is flowing from said third reaction zone by gravity into said fourth reaction zone, continuously adding into said purified waste water flowing from said third reaction zone into said fourth reaction zone chemical oxidizing agent, prefereably potassium permanganate, or hydrogen peroxide, or chlorine, or their mixture, oxidizing in said fourth reaction zone the remaining impurities and killing simultaneously bacteria and viruses present in the purified waste water by said chemical oxidizing agents, and removing the residual suspended solids by settling and flowing the purified waste water out of said fourth reaction zone for further treatment or disposal or reuse.

4. The process of claim 3 wherein a fifth reaction zone separated by vertical partition from fourth and third reaction zones is formed in said reaction tank, said purified waste water is flowing from said fourth reaction zone by gravity into said fifth reaction zone, said fifth reaction zone containing granular charcoal, said purified waste water being flown through said charcoal, decomposing said remaining oxidizing agents present in the purified waste water in contact with said charcoal and flowing the purified waste water out of said fifth reaction zone for further treatment, reuse or disposal.

* * * * *